United States Patent [19]
Bigolin

[11] Patent Number: 4,961,609
[45] Date of Patent: Oct. 9, 1990

[54] COMFORTABLE USE BICYCLE SADDLE

[76] Inventor: Giuseppe Bigolin, Via Fermi, 2/A—31010, Casella d'Asolo (Treviso), Italy

[21] Appl. No.: 383,931

[22] Filed: Jul. 21, 1989

[30] Foreign Application Priority Data

Jul. 27, 1988 [IT] Italy .................. 21671/88[U]

[51] Int. Cl.⁵ .............................................. B62J 1/00
[52] U.S. Cl. .................................... 297/214; 297/208
[58] Field of Search ................ 297/195, 214, DIG. 1, 297/211, 453, 208, 207

[56] References Cited

U.S. PATENT DOCUMENTS

| 1,322,959 | 11/1919 | Sawasaki | 297/214 |
| 4,451,083 | 5/1984 | Marchello | 297/214 |
| 4,456,295 | 11/1981 | Francu | 297/211 |
| 4,547,920 | 10/1985 | Hulsedush et al. | 297/DIG. 1 |

*Primary Examiner*—Peter A. Aschenbrenner
*Attorney, Agent, or Firm*—Bucknam and Archer

[57] ABSTRACT

The saddle comprises a saddle body, a perforated coating cover and an air permeable padding, the saddle body being mounted on a bearing frame provided with damper elements.

1 Claim, 1 Drawing Sheet

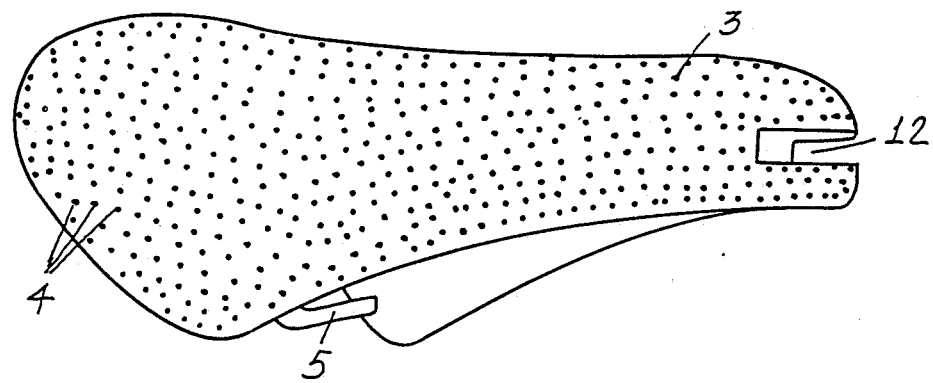
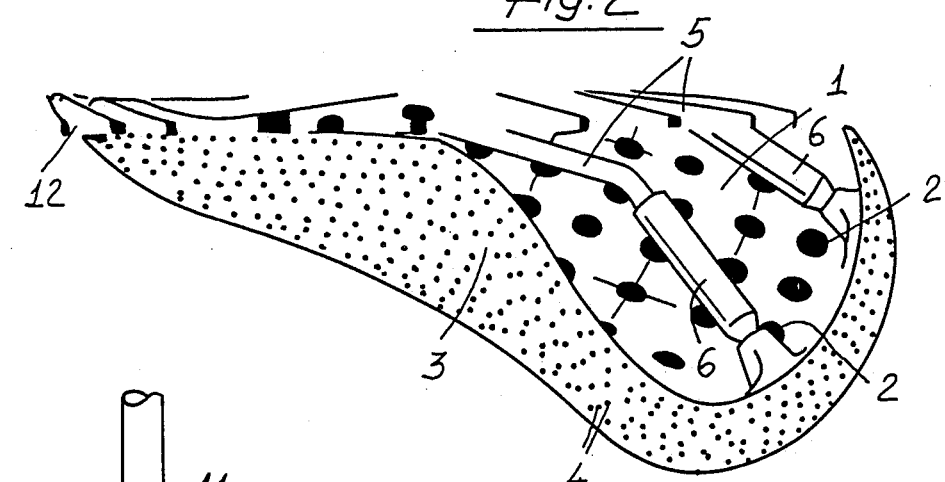
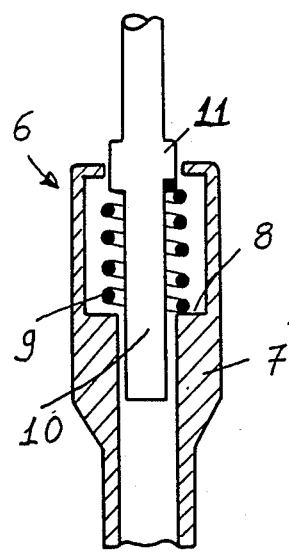

COMFORTABLE USE BICYCLE SADDLE

BACKGROUND OF THE INVENTION

The present invention relates to a bicycle saddle so designed and arranged as to be comfortably used by the cyclist.

As is known, bicycle saddles conventionally consist of a metal spring loaded frame, on which there is usually provided a padding covered by a suitable covering material.

These known bicycle saddles, on the other hand, are scarcely comfortable since they are made from scarcely air permeable materials.

Thus, known bicycle saddles prevent the body part supported thereby from properly perspirating, with consequent heating and sweating phenomena.

SUMMARY OF THE INVENTION

Accordingly, the present invention sets out to overcome the above mentioned drawbacks, by providing a bicycle saddle which is so designed and arranged as to allow for a comparatively great air flow to pass through its coating cover.

Within the scope of this aim, a main object of the present invention is to provide such a bicycle saddle which is provided with an improved springing system.

Another object of the invention is to provide a bicycle saddle which is very simple construction-wise and very reliable in operation.

According to one aspect of the present invention the above aim and objects, as well as yet other objects, which will become more apparent hereinafter, are achieved by a bicycle saddle so designed and arranged as to be comfortably used by a cyclist, characterized in that said saddle comprises a body and a perforated coating as well as an air permeable padding, said body being mounted on a frame provided with damping elements.

BRIEF DESCRIPTION OF THE DRAWINGS

Further characteristics and advantages of the improved bicycle saddle according to the prsent invention will become more apparent from the following detailed description of an embodiment thereof, which is illustrated, by way of an indicative but not limitative example, in the figures of the accompanying drawings, in which:

FIG. 1 is a perspective side view illustrating the bycicle saddle according to the present invention;

FIG. 2 is a bottom perspective view of the subject bicycle saddle; and

FIG. 3 is a longitudinal cross-section view illustrating one of the damping elements associated with the bicycle saddle according to the invention.

DESCRIPTION OF THE PREFERRED EMBODIMENT

With reference to the figures of the accompanying drawings, the improved bicycle saddle according to the present invention comprises a saddle body 1, defining a suitably shaped surface through the thickness of which there are formed a plurality of throughgoing holes 2.

Aboe the saddle body there is provided a a coco or other suitable perspirable material padding, which is held in its set position by a suitable coating material 3 also provided with a plurality of aerating holes 4.

As shown, the saddle body is mounted on a bearing frame 5 which is rigid with the saddle and is provided, at its end portions, with corresponding telescopic end dampers 6.

These telescopic dampers, in particular, substantially comprise a tubular body 7 inside of which there is formed an abutment 8 thereagainst a coil spring 9 is abutted.

The spring 9, as shown, encompasses said end portions 10 of the bar or rod members forming said bearing frame, which rods are provided with a respective circumferential enlarged portion 11, provided for engaging the opposite end of the spring.

As shown each end telescopic damper has one end thereof engaged with a respective frame rod 5, whereas the other end thereof is engaged with a respective lug 2' associated with the saddle body 1.

The provision of the mentioned telescopic dampers, in replacement of the conventional springs, greatly improves the bicycle saddle performance since, by providing it with proper damping characteristics, improves its stability, thereby further improving the pedalling efficiency of the cyclist.

Moreover, at the front portion of the saddle there is preferably formed a cross slot 12 operating as an air sucking element.

The provision of this slot, in particular, in such as to favour a great air passage in contact with the saddle body and through the padding, during a high speed advancing of the bicycle.

Accordingly, a great upwardly directed air flow is also generated which, passing through the coating perforations, greatly improves the cyclist comfort.

While the invention has been disclosed and illustrated with reference to a preferred embodiment thereof, it should be apparent that the disclosed embodiment is susceptible to several modifications and variations all of which will come within the spirit and scope of the accompanying claims.

I claim:

1. A bicycle saddle of the type comprising a saddle body including a plurality of throughgoing holes, a perforated coating cover on said saddle body and an air permeable padding within said saddle body wherein said saddle further comprises a saddle frame comprising two frame side rod members extending longitudinally of and connected at the ends of said saddle body and each including a respective end damper element, each said end damper element having a respective tubular body including therein an abutment which thereagainst a coil spring abuts, said spring encompassing end portions of said rod members forming one end of said saddle frame and are provided with a respective circumferential enlarged portion engaging one end of said coil spring, each said damper element having one end thereof engaged with a lug associated with said saddle body.

* * * * *